United States Patent [19]

Inagaki

[11] Patent Number: 5,923,902
[45] Date of Patent: Jul. 13, 1999

[54] SYSTEM FOR SYNCHRONIZING A PLURALITY OF NODES TO CONCURRENTLY GENERATE OUTPUT SIGNALS BY ADJUSTING RELATIVE TIMELAGS BASED ON A MAXIMUM ESTIMATED TIMELAG

[75] Inventor: Yoshihiro Inagaki, Hamamatsu, Japan

[73] Assignee: Yamaha Corporation, Hamamatsu, Japan

[21] Appl. No.: 08/800,969

[22] Filed: Feb. 19, 1997

[30] Foreign Application Priority Data

Feb. 20, 1996 [JP] Japan .................................. 8-055400

[51] Int. Cl.⁶ ........................................ G06F 13/00
[52] U.S. Cl. ....................... 395/878; 395/826; 395/879; 395/881
[58] Field of Search ..................... 370/350, 468; 375/356; 395/551, 826, 878, 879, 881; 707/8; 365/189.04

[56] References Cited

U.S. PATENT DOCUMENTS

| | | | |
|---|---|---|---|
| 5,140,333 | 8/1992 | Parker | 342/371 |
| 5,269,020 | 12/1993 | Kakimoto | 707/8 |
| 5,408,506 | 4/1995 | Mincher et al. | 375/356 |
| 5,559,962 | 9/1996 | Okamura et al. | |
| 5,570,372 | 10/1996 | Shaffer | 370/468 |
| 5,576,997 | 11/1996 | Masuda et al. | 365/189.04 |
| 5,586,119 | 12/1996 | Scribano et al. | 370/350 |
| 5,664,164 | 9/1997 | Riddle | 395/551 |

FOREIGN PATENT DOCUMENTS

3-29896   3/1991   Japan .
7-121159  5/1995   Japan .

*Primary Examiner*—Thomas C. Lee
*Assistant Examiner*—Chien Yuan
*Attorney, Agent, or Firm*—Graham & James LLP

[57] ABSTRACT

A network system has a plurality of nodes interconnected to each other for transferring a data packet from a transmitting node to receiving nodes so as to concurrently drive the same. In the transmitting node, an estimating device estimates a time lag which exists between the transmitting node and each of the receiving nodes and which varies among the receiving nodes. A determining device detects a maximum one of the estimated time lags so as to set a reference time by which all of the receiving nodes can be synchronized with each other. A transmitting device transmits a data packet to the receiving nodes together with the reference time stamped on the data packet. In each of the receiving nodes, a receiving device receives the data packet together with the stamped reference time. An adjustment device temporarily retains the received data packet for adjusting the difference in the time lags among the receiving nodes according to the reference time so that all of the receiving nodes can be driven concurrently with each other.

10 Claims, 8 Drawing Sheets

SYSTEM FOR SYNCHRONIZING A PLURALITY OF NODES TO CONCURRENTLY GENERATE OUTPUT SIGNALS BY ADJUSTING RELATIVE TIMELAGS BASED ON A MAXIMUM ESTIMATED TIMELAG

BACKGROUND OF THE INVENTION

The present invention relates to a network system composed of a plurality of devices connected to each other by logical paths constructed on a bidirectional data bus for transferring data among the plurality of the devices.

Conventionally, a multiple of electronic devices are interconnected to build up a network system. In such a network system, the devices are physically coupled to each other by a number of cables which occupy considerable space. Once the cables are disconnected from the devices, it is laborious to restore the connection of the network system. In order to obviate this inconvenience, the devices are physically connected to each other by a common cable.

A plurality of logical paths are formed in the physical common cable to transfer data among the electronic devices in a sophisticated network system. FIG. 1 shows an example of such a network system. In this example, the network system includes seven numbers of electronic devices which are denoted by nodes N1–N7. The nodes N1–N7 are physically interconnected to each other by means of cables according to predetermined sequence.

Each of the nodes N1–N7 is constructed as shown in FIG. 2. The node is equipped with a physical layer 11 having input/output terminals 19-1, 19-2 and 19-3. One cable is connected to one of the input/output terminals 19-1, 19-2 and 19-3. The physical layer 11 operates to transmit and receive data. A link layer 12 is disposed over the physical layer 11. Though not shown in the figure, higher layers are further disposed on the link layer 12.

In the network system constructed as described above, for example, the node N2 may transfer data to the nodes N4 and N5. In this case, the node N2 transfers data to the node N5 with a transfer time lag d25. The node N2 also transfers data to the node N4 with another transfer time lag d24. The former transfer lag d25 may be longer than the latter transfer time lag d24 depending on distances of the nodes N4 and N5 from the node N2. Namely, the data transmitted from the node N2 does not arrive at the nodes N4 and N5 at the same time, but is received by the nodes N4 and N5 at different times.

Normally, such a transfer time lag varies dependently on a distance between the nodes. The transfer time lag becomes maximum when data is transferred from one extreme node to another extreme node in the network system. In a music network system, one node may transmit audio data on realtime basis to a plurality of nodes so as to control the same to generate musical sounds according to the audio data received by the plurality of the nodes. However, in reality, the plurality of the nodes could not concurrently generate the musical sounds due to difference of the transfer time lags.

In order to obviate such a drawback, each of the nodes N1–N7 operates to compensate for the relative difference in the data transfer time lag according to an absolute reference time which is predetermined to cover the maximum or worst transfer time lag in the data communication of the existing network system. Namely, the node receiving the data operates to temporarily withhold or retain the received data in the link layer 12 before the received data is passed to the higher layer for an adjustive time interval which is determined by subtracting the transfer time lag attributive to the receiving node from the absolute reference time. In this case, the receiving node is provided with a static data buffer in the link layer 12 for temporarily withholding or retaining the received data for the predetermined adjusting time interval. By such a manner, the network system can assure concurrent or synchronous treatment of realtime data received by the respective nodes.

However, the absolute reference time is fixed and cannot be set shorter than the maximum or worst transfer time lag in the conventional network system. Therefore, the received data may be unnecessarily or unduly withheld or retained in the link layer when the data is transferred between near nodes with a short transfer time lag relative to the reference time. This would unduly limit a nominal data transfer rate, thereby disadvantageously hindering communication performance of the nodes. Further, each node must be equipped with the buffer having an unduly great size.

In the music network system, the node normally applies signal processing such as digital/analog conversion to the received data passed from the link layer 12 so as to generate the musical sound. The node may consume a substantial time for the signal processing. Such an operational time lag may vary dependently on different functions of the respective nodes. Therefore, final acoustic output timings of the realtime audio data are made inconsistent among the plurality of the nodes due to the difference of the operational time lags of the respective nodes even though the transfer time lags are compensated throughout the network system.

SUMMARY OF THE INVENTION

A first object of the invention is to provide an improved network system which can raise an actual data transfer rate while compensating for difference in a data transfer time lag among a plurality of nodes.

A second object of the invention is to provide an improved network system which can compensate for difference in operational time lags unique to respective nodes so as to ensure concurrent or synchronous signal outputtings among the nodes.

The inventive network system comprises a plurality of nodes that are interconnected to each other and that transfer a data packet from a transmitting node to receiving nodes to concurrently drive the same. The transmitting node comprises an estimating device that estimates a time lag which exists between the transmitting node and each of the receiving nodes and which varies among the receiving nodes, a determining device that detects a maximum one of the estimated time lags to set a reference time by which all of the receiving nodes can be synchronized with each other, and a transmitting device that transmits a data packet to the receiving nodes together with the reference time stamped on the data packet. Each of the receiving nodes comprises a receiving device that receives the data packet together with the stamped reference time, and an adjustment device that temporarily retains the received data packet to adjust the difference in the time lags among the receiving nodes according to the reference time such that all of the receiving nodes can be driven concurrently with each other.

In a form, the estimating device estimates a transfer time lag which represents a traveling time of the data packet from the transmitting node to each of the receiving nodes so that the determining device detects a maximum one of the transfer time lags to set the reference time to thereby absorb difference in the transfer time lags among the receiving nodes. In detail, the estimating device estimates the transfer time lag in terms of a hop number counted from the transmitting node to each of the receiving nodes.

In another form, the estimating device estimates an operational time lag which represents a time consumed for processing the data packet in each of the receiving nodes so that the determining device detects a maximum one of the estimated operational time lags to set the reference time to thereby absorb difference of the operational time lags among the receiving nodes.

In a practical form, the estimating device estimates a total time lag which is a sum of a transfer time lag and an operational time lag, the transfer time lag representing a traveling time of the data packet from the transmitting node to each of the receiving nodes, and the operational time lag representing a time consumed for processing the data packet in each of the receiving nodes, so that the determining device detects the maximum one of the total transfer time lags as the reference time to thereby absorb difference in the total transfer time lags among the receiving nodes. In detail, the adjustment device temporarily retains the received data packet for an adjustive time interval which is calculated by subtracting the time lag from the reference time.

In a specific form, the transmitting node transmits an audio data packet while each of the receiving nodes operates to generate tones according to the audio data packet concurrently with each other when the reference time reaches.

According to the invention, different data transfer time lags among the network nodes are compensated on the basis of the worst one of the transfer time lags. The worst time lag is dynamically determined a case by case dependently on locations of attending nodes. Therefore, the worst or maximum time lag is not fixed but may be reduced as the distance among the participating node becomes short, thereby raising the effective or actual data communication rate. Further, according to the invention, different operational time lags among the network nodes are compensated to synchronize the final output timings among the network nodes. Moreover, the data transfer time lags and the operational time lags are totally compensated according to the invention to thereby achieve both of the high data communication rate and the synchronization among the nodes.

DETAILED DESCRIPTION OF THE INVENTION

Figure 1:
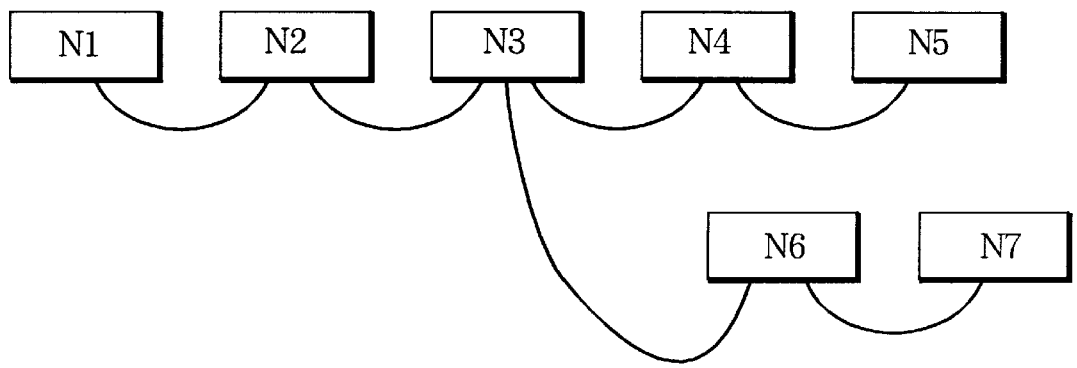
FIG. 1 is a schematic block diagram showing an example of a network system.

FIG. 1 shows a typical construction of the inventive network system which is composed of a plurality of electronic devices interconnected to each other as depicted by nodes N1–N7. In this network system, the node N1 is connected to the node N2. The node N2 is connected to the node N3. The node N3 is connected to the nodes N4 and N6. Further, the node N4 is connected to the node N5. The node N6 is connected to the node N7. These nodes N1–N7 are coupled to each other by means of physical cables.

Figure 2:
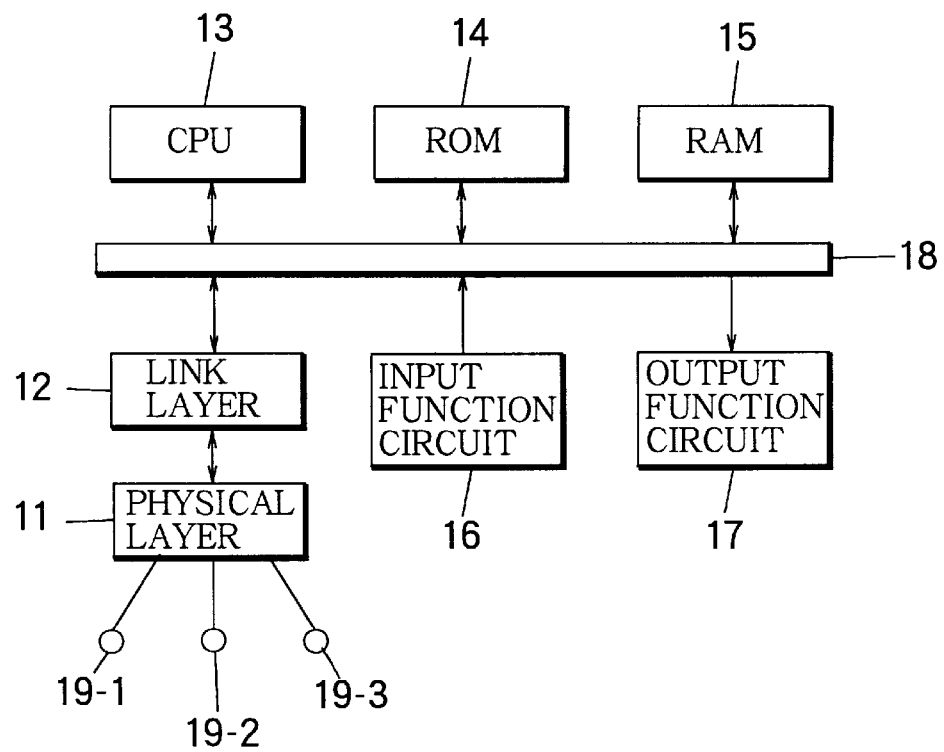
FIG. 2 is a schematic block diagram showing typical construction of a node involved in the network system.

FIG. 2 shows a typical construction of the nodes N1–N7. As illustrated in the figure, each node is equipped with a physical layer 11 having three numbers of input/output terminals 19-1, 19-2 and 19-3. The physical layer 11 defines a physical interface for connection between the nodes. The physical layer 11 carries out conversion between electric digital data and logical symbols treated by a link layer 12. The link layer 12 is positioned above the physical layer 11 for performing various tasks including addressing from node to node, checking and framing of data and feeding of data to higher layers. In contrast to the prior art, the link layer 12 is not provided with any static buffer for compensating the data transfer time lag according to the invention.

A central processing unit (CPU) 13 executes a program stored in a ROM 14 to realize specific function of the node. The ROM (read only memory) 14 memorizes the program executed by the CPU 13 and unique delay information representative of an operational time lag consumed when an output function circuit 17 carries out signal processing. A random access memory (RAM) 15 memorizes its own unique delay information and collected unique delay information of other nodes as well as hop numbers which are utilized to estimate transfer time lags with respect to the respective nodes. One hop is allotted to an immediately adjacent node. Two hops are allotted to a subsequent node positioned next to the immediately adjacent node.

An input function circuit 16 is connected to an external microphone (not shown) and contains an analog-to-digital converter for converting an analog audio signal picked up by the microphone into a corresponding digital signal. On the other hand, the output function circuit 17 is connected to an external loudspeaker (not shown) and contains a digital-to-analog converter for converting a digital signal into an analog audio signal to feed the loudspeaker. These blocks are interconnected to each other by a data bus 18.

Figure 3:
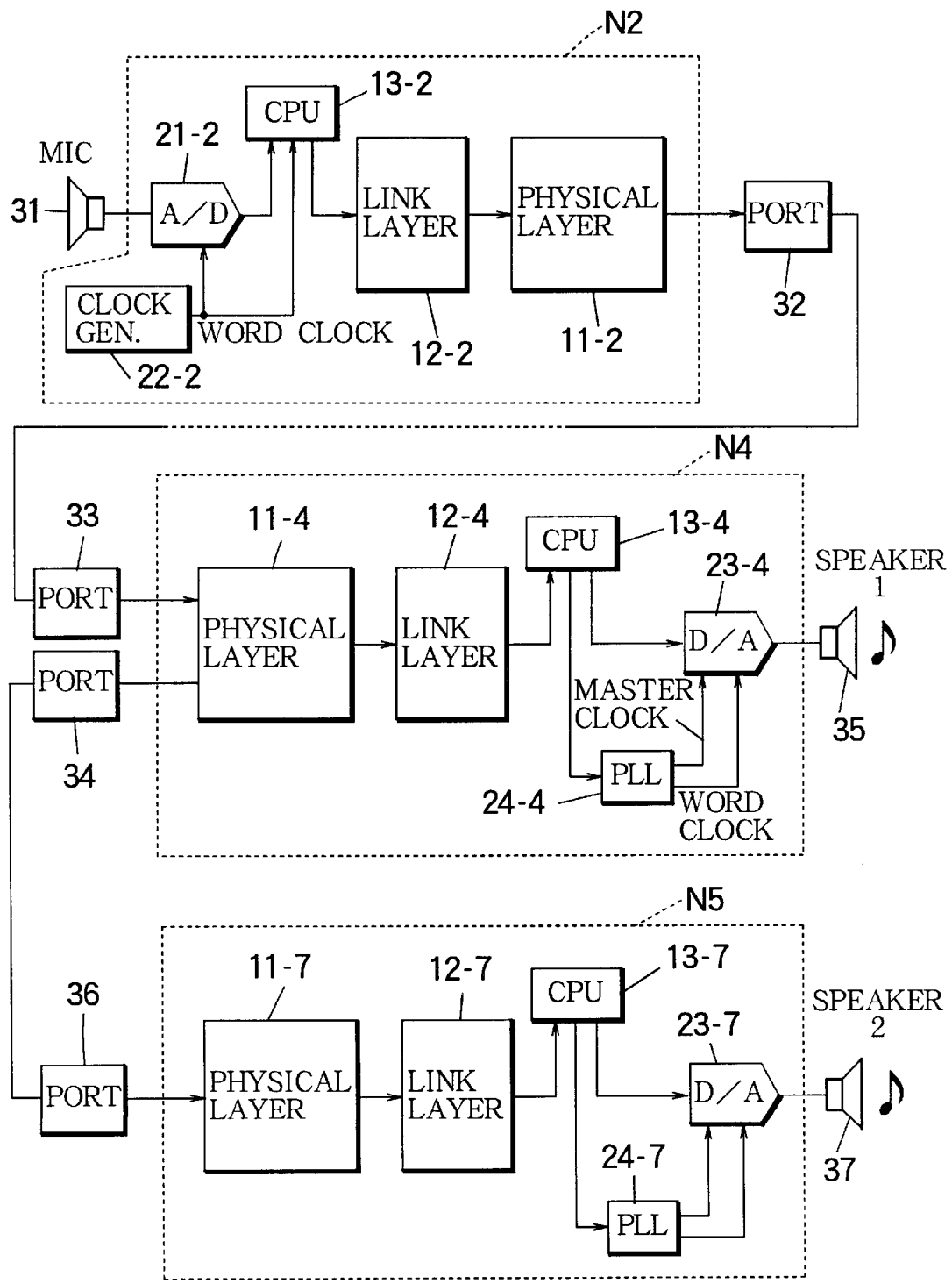
FIG. 3 is an equivalent circuit diagram showing operating states of nodes interconnected to each other.

Next, description is given for operation of the inventive network system containing the nodes N1–N7. For example, the node N2 is selected to transmit data while the nodes N4 and N5 are selected to receive the data. FIG. 3 illustrates a virtual connecting state of the network system. As shown in the figure, the node N2 transmits data to the network through a transmitter port 32. The node N4 receives the data from the network through a receiver port 33. Further, the node N4 retransmits the received data to the network through a transmitter port 34. Lastly, the node N5 receives the retransmitted data from the network through a receiver port 36. Namely, the node N4 receives the data, and at the same time relays the data to the node N5.

The node N2 is connected to a microphone (MIC) 31. The realtime analog signal collected by the microphone 31 is converted into the digital data. Then, the digital data is packetized and transmitted to the network. The nodes N4 and N5 feed associated loudspeakers 35 and 37, respectively. The nodes N4 and N5 unpacketize the received data and process the data so as to generate musical sounds through the respective loudspeakers 35 and 37 concurrently with each other.

FIG. 3 shows only an equivalent circuit structure of transmitter function of the node N2. However, it should be noted that the node N2 has also receiver function. In the figure, the input analog signal from the microphone 31 is converted into the digital signal by the analog-to-digital converter (A/D) 21-2, and is then fed to a CPU 13-2. The A/D 21-2 is supplied with a word clock signal generated by a clock generator 22-2. The microphone input signal is converted into the digital signal in response to the word clock signal.

The CPU 13-2 is also supplied with the word clock signal for sequentially packetizing the digital signal to produce a train of packets of the digital signal. Further, the packet is added with reference time information which is determined by the CPU 13-2 according to transfer time lags relative to the nodes N4 and N5 and according to operational time lags unique to the nodes N4 and N5. The packet added with the reference time information is passed from the CPU 13-2 to a link layer 12-2. Further, the packet is transmitted from a subsequent physical layer 11-2 to the network through the transmitter port 32.

Figure 7:
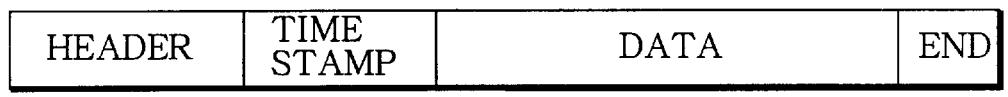
FIG. 7 is a schematic diagram showing a typical format of a data packet transferred in the network system.

FIG. 7 shows an example of a format of the data packet. The packet is composed of a header, a time stamp, a data content and a tail. The header contains a transmitter address, a receiver address and a channel number. The time stamp is placed to represent the reference time information. The tail contains an end mark (END) which indicates an end of the packet.

The node N2 provisionally obtains necessary information associated to other nodes according to connection constructing process which is carried out when the network system is constructed. The necessary information includes the operational time lags unique to the nodes N4 and N5 and transfer time lags relative to the nodes N4 and N5. The obtained operational time lag and the transfer time lag are summed together to calculate a total time lag for each of the nodes N4 and N5. The maximum or worst one of the calculated total time lags is detected to determine the reference time information. In the example shown in FIG. 3, the total time lag for the node N5 is greater than that for the node N4. Thus, the maximum total time lag for the node N5 is determined as the time reference information. By such a manner, the invention adopts the relative time reference which is determined dynamically according to participating nodes N2, N4 and N5, whereas the prior art adopts the absolute time reference which is determined staticly according to all nodes N1–N7.

Figure 9:
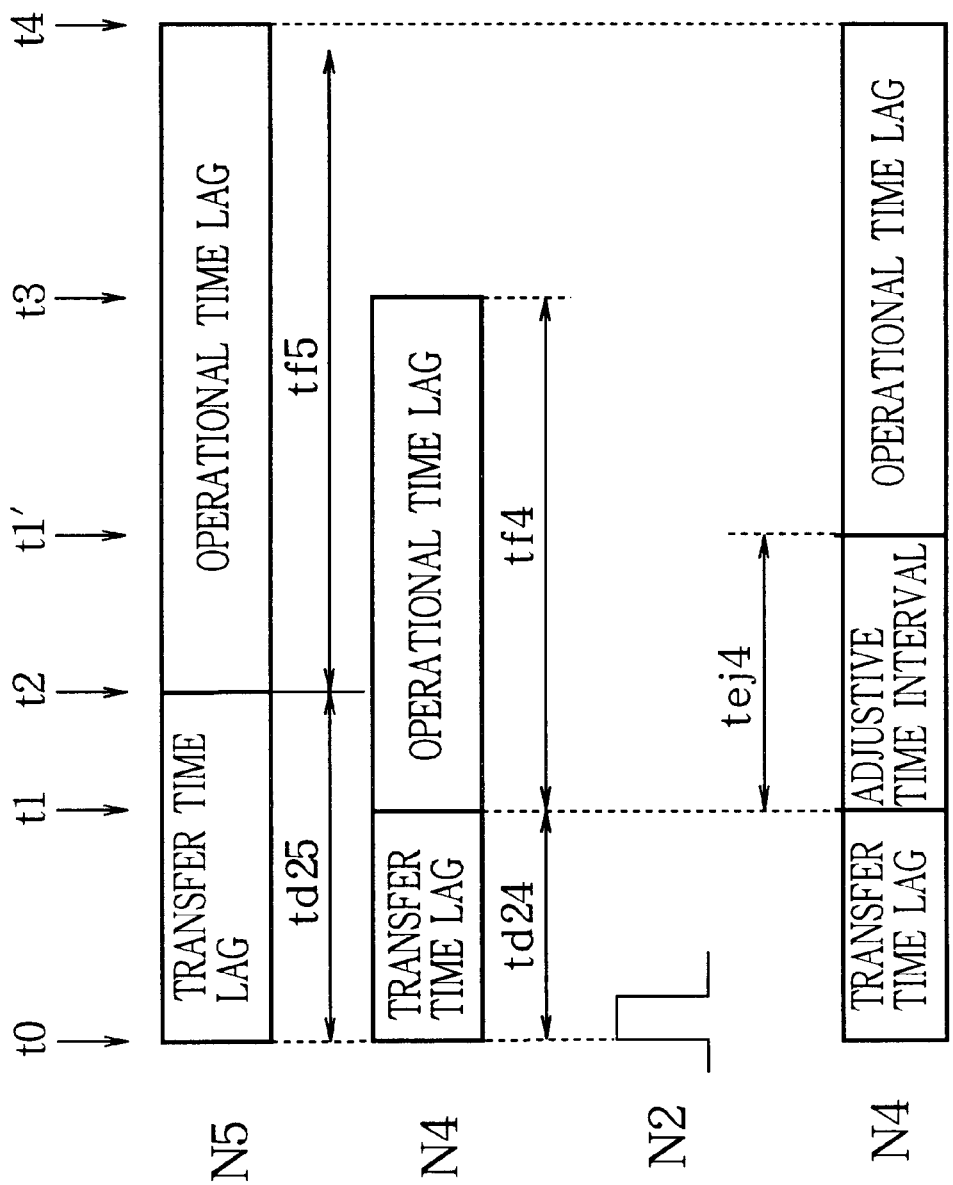
FIGS. 9(a)–9(d) are a timing chart showing time-sequential operation of nodes involved in the network system.

As shown in FIG. 9(a), the node N5 has the transfer time lag td25 relative to the node N2 and the unique operational time lag tf5. As shown in FIG. 9(b), the node N4 has the transfer time lag td24 relative to the node N2 and the unique operational time lag tf4. After the node N2 transmits a packet of the data at a time t0 as shown in FIG. 9(c), the node N4 could generate a musical tone at a time t3 which is given by t0+td24+tf4. However, the node N5 could generate a musical tone, at least, at a time t4 which is later than the time t3 and which is given by t0+td25+tf5. In view of this, as shown in FIG. 9(d), the node N4 temporarily withhold or retain the packet received at a time t1 for an adjustive time interval taj4 before passing the received packet to the output function circuit. By such a manner, the nodes N4 and N5 can generate the musical tones concurrently with each other at the time t4.

According to the above described example, the reference time is determined as the total time lag td25+tf5. The receiving nodes effect synchronization of the tone generation according to the reference time information distributed from the transmitting node. The reference time is set by placing the time stamp on the packet to designate a network time at which the musical tones should be generated simultaneously from the receiving nodes. Namely, the nodes N4 and N5 operate to generate musical tones concurrently with each other through the respective loudspeakers 35 and 37 when the current network time reaches the time stamp placed on the received packet.

Description is given for operation of the receiving node N4. The other receiving node N5 operates in similar manner. As shown in FIG. 3, the physical layer 11-4 of the node N4 receives the packet through the receiver port 33. The data contained in the packet is converted into a logical symbol by the physical layer 11-4, and is then passed to the CPU 13-4 through the link layer 12-4. The CPU 13-4 calculates an adjusted time stamp by subtracting its own unique operational time lag from the time stamp placed on the received packet. Then, when the current network time reaches the adjusted time stamp, the CPU 13-4 feeds the digital data carried by the packet to the digital-to-analog converter (D/A) 23-4. The D/A 23-4 serves as an output function circuit of the node N4. The D/A 23-4 outputs the analog audio signal which is delayed by the unique operational time lag from the input digital data. Thus, the loudspeaker 35 connected to the D/A 23-4 can generate the musical tone when the current network time reaches the time stamp placed on the packet transmitted from the node N2.

Referring back to FIGS. 9(a)–9(d), the node N2 transmits the data packet at the time t0 as shown in FIG. 9(c). This packet arrives at the receiver port 33 of the node N4 at the time t1 which is given by t0+td24 as shown in FIG. 9(b). At this moment, if the node N4 does not perform any adjustive delay process, the node N4 would generate a musical tone from the associated loudspeaker 35 at the time t3 which is given by t1+tf4.

On the other hand, the node N5 receives the packet at the time t2 which is given by t0+td25. Then, the node N5 generates the musical tone at the time t4 which is given by t2+tf5. Therefore, the node N4 would generate the musical tone earlier than the node N5 by a time difference between t3 and t4 if no adjustment is conducted. In view of this, according to the invention, as shown in FIG. 9(d), the node N4 temporarily withhold or retain the data packet for the adjustive time interval taj4 such that the data packet is actually passed from the CPU 13-4 to the D/A 23-4 at the time t1' which is defined by the adjusted time stamp. Consequently, the node N4 can generate the musical tone at the time t4 just concurrently with the tone generation by the node N5. The end point t1' of the adjustive time interval taj4 is determined by the adjusted time stamp which is calculated by subtracting the own unique operational time lag tf4 from the critical time stamp placed on the received data packet.

The CPU 13-4 detects clock information provided from the transmitting node N2. The phase-locked loop (PLL) 24-4 reproduces the same clock signal as that used in the node N2 according to the provided clock information. The reproduced clock signal is frequency-divided within the PLL 24-4 to generate a word clock and a master clock, which are fed to the D/A 23-4. The D/A 23-4 converts the digital data into the corresponding analog signal based on the fed clocks. It should be noted that FIG. 3 shows only the transmitting part of the node N2 and the receiving part of the node N4 and N5. However, in a complete form, each of the nodes N2, N4 and N5 has both of the transmitting and receiving parts.

As described above, according to the exemplified embodiment, the reference time information is set as the maximum or worst one of the total time lags, each of which is a sum of the transfer time lag and the operational time lag calculated for each of the receiving nodes. More conveniently, the reference time may be set to the maximum one of the transfer time lags of the receiving nodes as far as difference of the operational time lags is not substantial among the plurality of the receiving nodes. By such a manner, the reference time can be dynamically or adaptively set shorter than the absolute reference time used in the prior art, thereby raising the data communication rate. Further, it would be expedient to set the reference time as the maximum one of the operational time lags unique to the respective receiving nodes as far as difference of the transfer time lags is not so significant among the plurality of the receiving nodes. By such a manner, the network system can reduce inconsistency in the tone generation timings among the receiving nodes. In the ideal form, the reference time is set to the maximum one of the total time lags, each of which is defined by the sum of the transfer time lag and the operational time lag per each receiving node. By such a manner, the network system not only can shorten a delay of the tone generation as compared to the prior art, but also can suppress inconsistency of the tone generation timings among the participating nodes.

Figure 4:
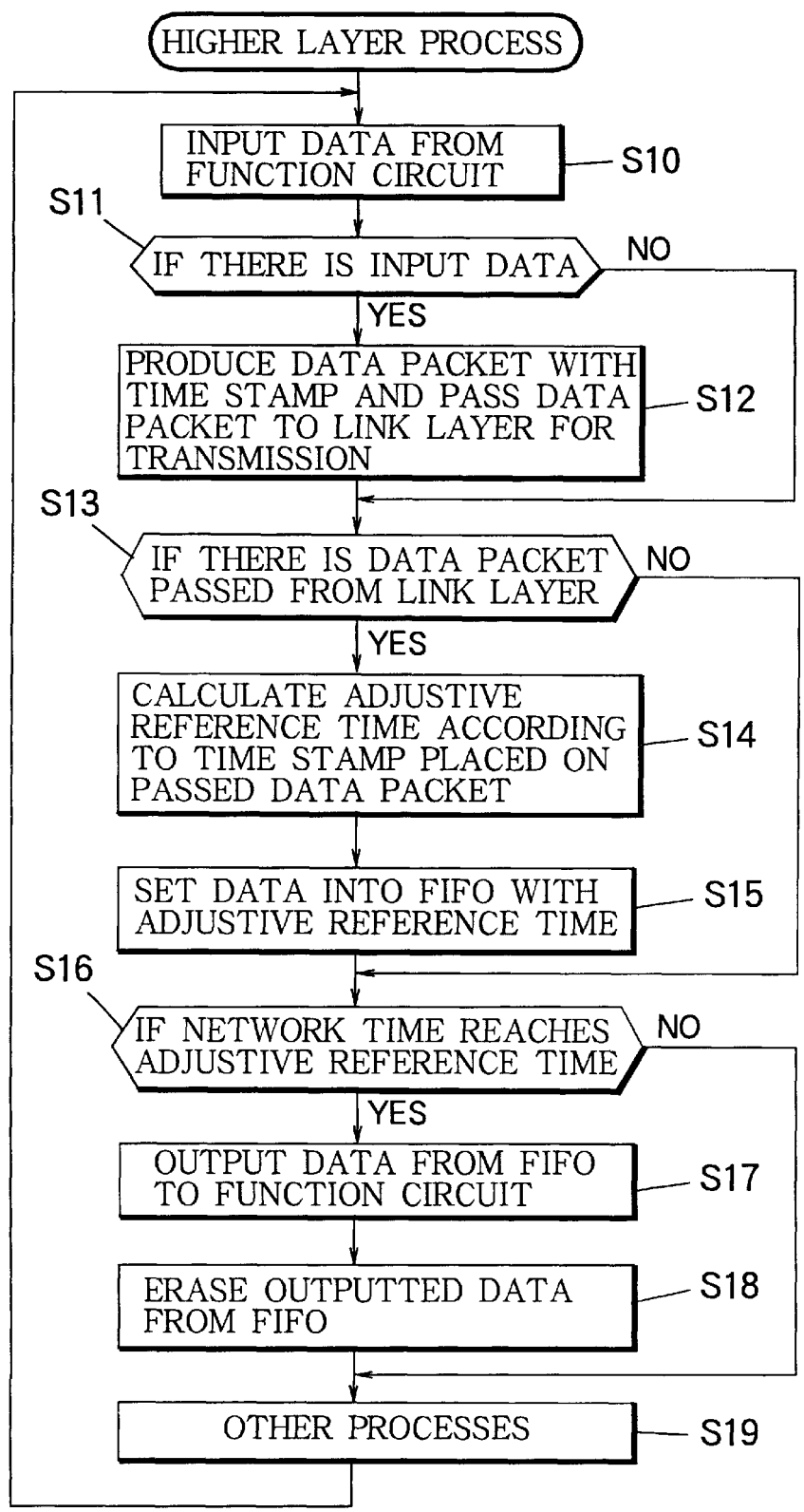
FIG. 4 is a flowchart showing higher layer process performed in the node.

Next, the description is given for operation of the node involved in the inventive network system in conjunction with flowcharts. FIG. 4 is a flowchart showing operation carried out by the higher layer positioned above the link layer 12 in the node. When the higher layer process is invoked, data is inputted from the input function circuit 16 at step S10. Then, it is checked at step S11 as to if data is actually inputted from the input function circuit 16. If YES, the inputted data is arranged into a packet at step S12. As shown in FIG. 7, the packet is set with the time stamp indicative of the reference time. The packet is passed to the link layer 12 with a sending request. The reference time stamped on the data packet is determined by adding the maximum one of the total time lags relative to the destination nodes to the current network time. The total time lag is the sum of the data transfer time lag relative to each destination node and the operational time lag unique to each destination node. The input function circuit 16 may include an A/D converter which converts an analog audio signal collected by a microphone into corresponding digital data. If the check result of step S11 is NO since there is no data input from the function circuit 16, subsequent step S12 is skipped and the process advances to step S13. By such a manner, the higher layer performs the transmitting process through steps S10–S12.

Then, the higher layer performs receiving process at step S13 and further steps. The higher layer checks at step S13 as to if there is a received data packet passed from the lower link layer 12. If YES, the reference time stamped on the received packet is transformed into the adjustive reference time at step S14. The adjustive reference time is calculated by subtracting the unique operational time lag which is caused by the output function circuit 17 or else from the reference time or target time at which the musical sound should be generated.

Then, the received data is set into a FIFO (First In First Out register) together with the adjustive reference time at step S15. Further, it is checked at step S16 as to if the current network time reaches the adjustive reference time at which the top data in the FIFO should be processed. In addition, check is made as to whether the data processing is possible or not. If YES, the data is passed from the FIFO to the output function circuit 17 at step S17. The output function circuit 17 processes the passed data such that the final processed signal is outputted from the function circuit 17 with the unique operational time lag. Consequently, as shown in FIG. 9(d), the musical sound is accurately generated at the target time t4 when the current network time reaches.

Then, the top data is erased from the FIFO after the top data is sent out to the network at step S18. Subsequently, other processes are carried out at step S19, where logical paths may be set to interconnect participating nodes. Thereafter, the routine returns to step S10. By such a manner, the sequence of steps S10–S19 is carried out cyclicly. The check result of step S16 remains NO if the current network time does not yet reach the adjustive reference time allotted to the top data in the FIFO. The routine jumps from step S16 to step S19 so that the higher layer process repeats the routine until the current network time reaches the adjustive reference time.

Figure 5:
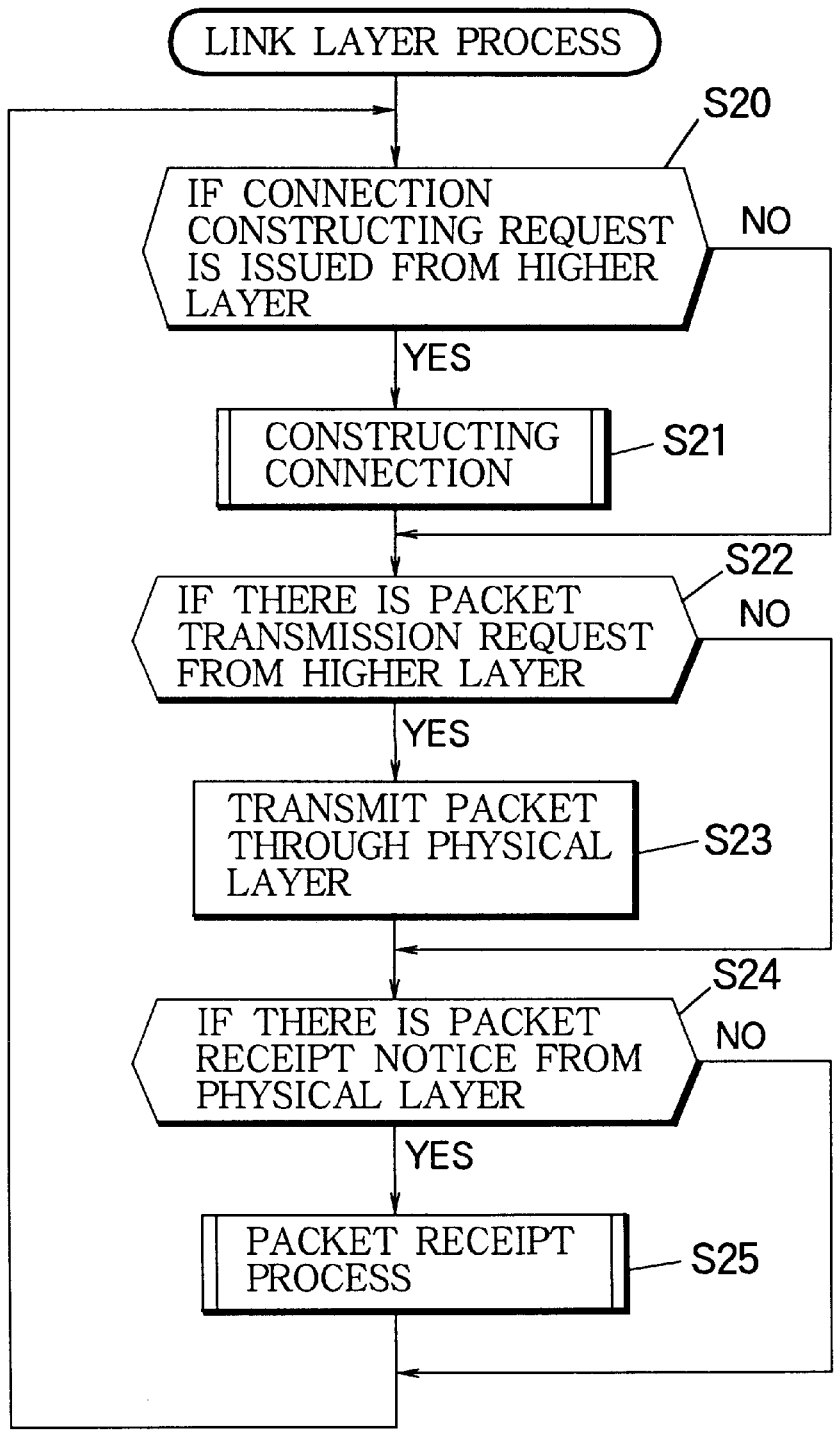
FIG. 5 is a flowchart showing link layer process performed in the node.

FIG. 5 is a flowchart showing process carried out by the link layer 12. In the flowchart, when the link layer process is commenced, it is checked at step S20 as to if a request for construction of connection is issued from the higher layer. If YES, process for constructing the node connection is carried out at step S21. If there is no request for construction of connection, the check result is NO so that step S21 is skipped.

Then, check is made at step S22 as to if there is a request for packet transmission from the higher layer. This packet transmission request is issued at step S12 carried out in the higher layer process as described before. If the check result of step S22 is YES, the packet is actually transmitted to the network at step S23 through the physical layer 11. If the check result of step S22 is NO, step S23 is skipped and the routine jumps to step S24. By such a manner, the link layer 12 performs the transmission process through steps S20–S23. The link layer 12 further performs receipt process from step S24.

In step S24, check is made as to if there is a packet receipt notice from the physical layer 11. If YES, packet receipt process is carried out at step S25. If the check result of step S24 is NO, step S25 is skipped. Then, the routine returns to step S20. By such a manner, the link layer process is repeatedly carried out through the cycle of steps S20–S25.

Figure 6:
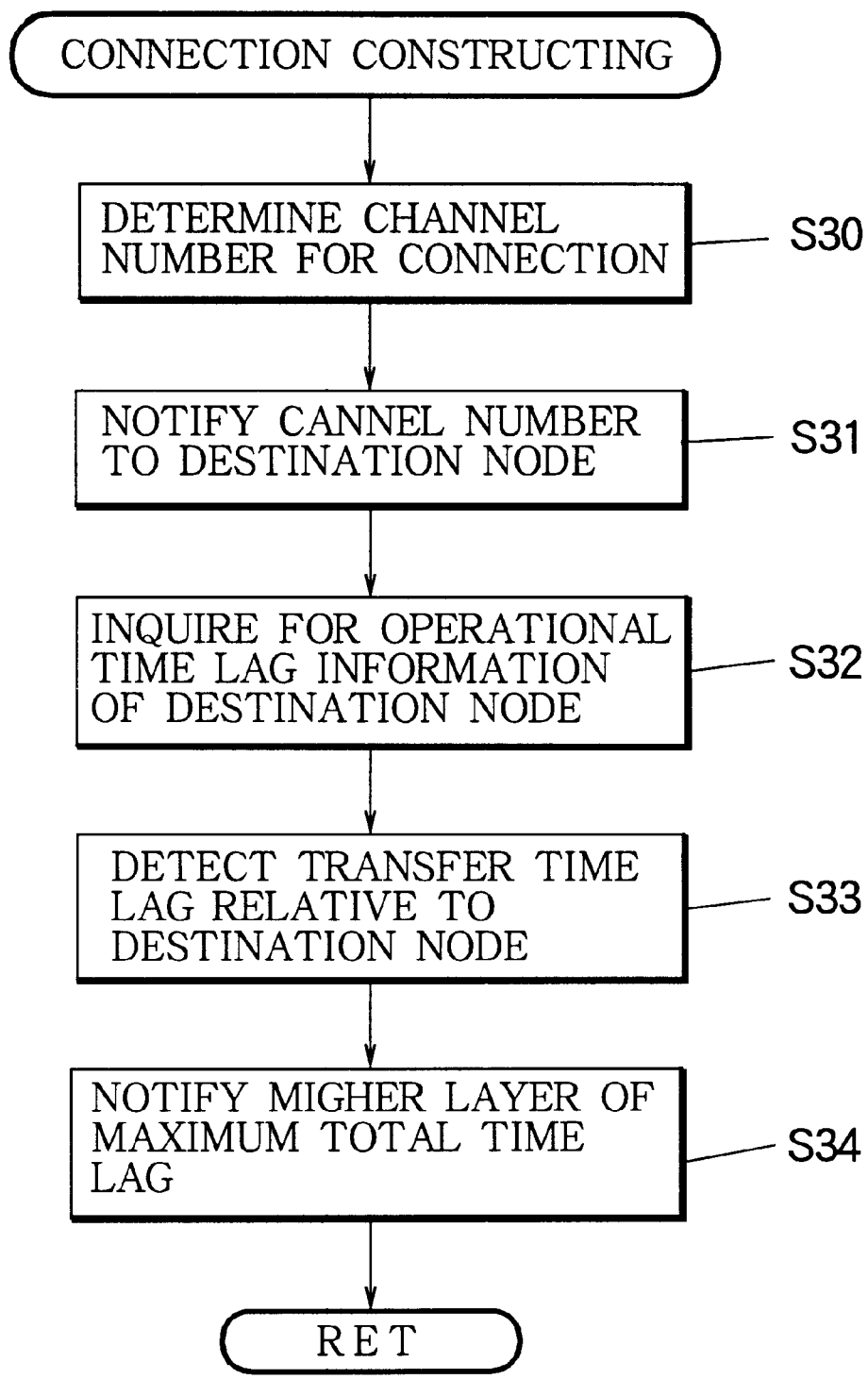
FIG. 6 is a flowchart showing connection constructing process involved in the link layer process.

FIG. 6 is a flowchart showing detail of the connection constructing process executed in step S21 of the link layer process. When the connection constructing process is commenced, a channel number is defined for connection at step S30. The channel number is uniquely set to avoid duplicative definition in the network system. Then, the defined channel number is noticed to each of destination nodes at step S31. Further, inquiry is made to each of the destination nodes about their unique operational time lags at step S32. In this case, each of the destination nodes is identified by acquiring their physical addresses with reference to a node table which lists node numbers and corresponding node information. By such a manner, the node N2 can acquire the operational time lags unique to the destination nodes N4 and N5.

Further, in subsequent step S33, a transfer time lag is estimated relative to each of the destination nodes based on the hop number. The hop number is "1" between a pair of adjacent nodes. The hop number is incremented as the number of intermediate nodes increases between the transmitting and receiving nodes. Each node provisionally acquires the hop numbers relative to other nodes when the network system is constructed. One node can estimate the transfer time lag relative to another node in proportion to the hop number. Then, at step S34, the unique operational time lag and the data transfer time lag are summed together to calculate the total time lag for each of the destination nodes. The maximum or worst one of the calculated total time lags is determined so as to set the reference time or target time. The link layer notifies the maximum total time lag to the higher layer. As described before, the higher layer adds the maximum total time lag to the current network time to determine the reference time or the target time which is stamped on the data packet at step S12 of the higher layer process. By such a manner, the connection constructing process is finished so that the routine returns to step S22 of the link layer process.

Figure 8:
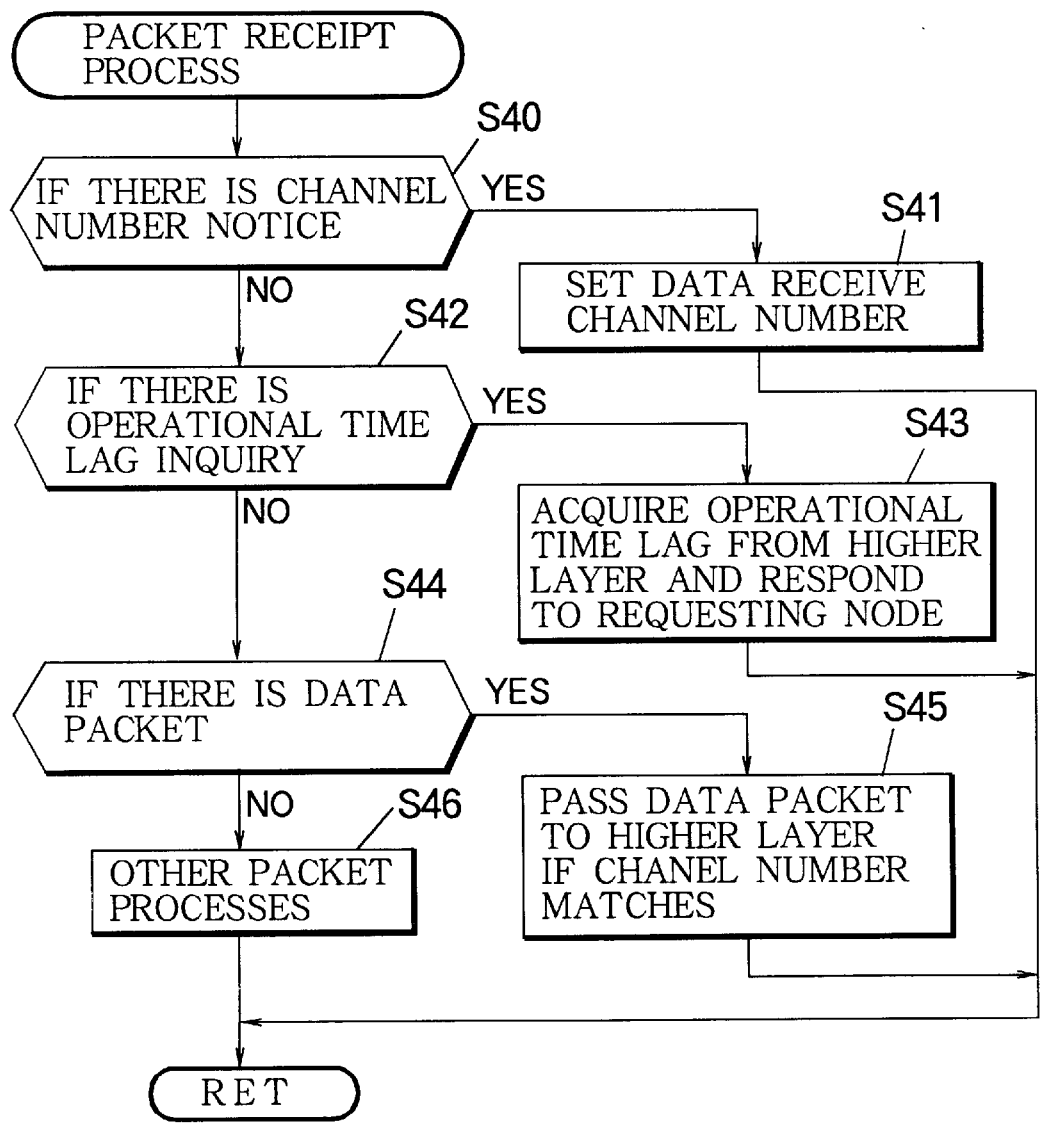
FIG. 8 is a flowchart showing packet receipt process involved in the link layer process.

FIG. 8 is a flowchart showing detail of the packet receipt process executed at step S25 of the link layer process. When the packet receipt process is commenced upon the packet receipt notice from the physical layer 11, check is made at step S40 as to if the received packet is to notice a channel number. If YES, the noticed channel number is set as a data receipt channel number at step S41. This notice of the channel number is issued at step S31 of the connection constructing process as described before.

If the check result of step S40 is NO, check is made at step S42 as to if the received packet is to inquire information about the unique operational time lag. If YES, the link layer acquires the own unique operational time lag from the higher layer at step S43. Then, the acquired information of the own unique operational time lag is returned to the requesting node. If the check result of step S42 is NO, subsequent check is made at step S44 as to if the received packet is a data packet. If YES, the received data packet is passed to the higher layer provided that the channel number contained in the header of the received packet matches the data receive channel number which is set in the channel constructing process. The data packet is processed by the higher layer at step S13 and further steps of the higher layer process as described before. If the check result of step S44 is NO, other processes are carried out at step S46, thereby returning to the link layer process. The routine also returns in case that the processes of steps S41, S43 and S45 are finished.

In the above description, the CPU within the receiving node interprets the time stamp placed on the received packet to carry out the time adjustment. Thereafter, the received data packet is passed to the output function circuit. Alternatively, this time adjustment process is carried out by a hardware sequencer. In the conventional network system, the allowable time lag is limited by the absolute reference time. Therefore, the number of nodes are restricted to prevent the time lag from exceeding the absolute reference time. In such a case, a bridge or shortcut connection is introduced into the network system to increase the number of nodes. The inventive network system can be applied to the bridge connection so as to achieve the synchronization among the nodes connected by bridges.

As described above, according to the invention, in order to absorb difference in transfer time lags among participating nodes, the wait time adjustment is conducted in each node according to the maximum one of the transfer time lags among the participating nodes. Accordingly, the data communication rate can be made faster as the number of the participating nodes decreases. Further, the inventive network system can absorb difference in operational time lags among the nodes so as to synchronize output timings among the nodes. Moreover, the inventive network system can absorb both of the differences in the data transfer time lags and the operational time lags among the nodes to thereby raise the data communication rate and to synchronize the output timings.

Figure 10:
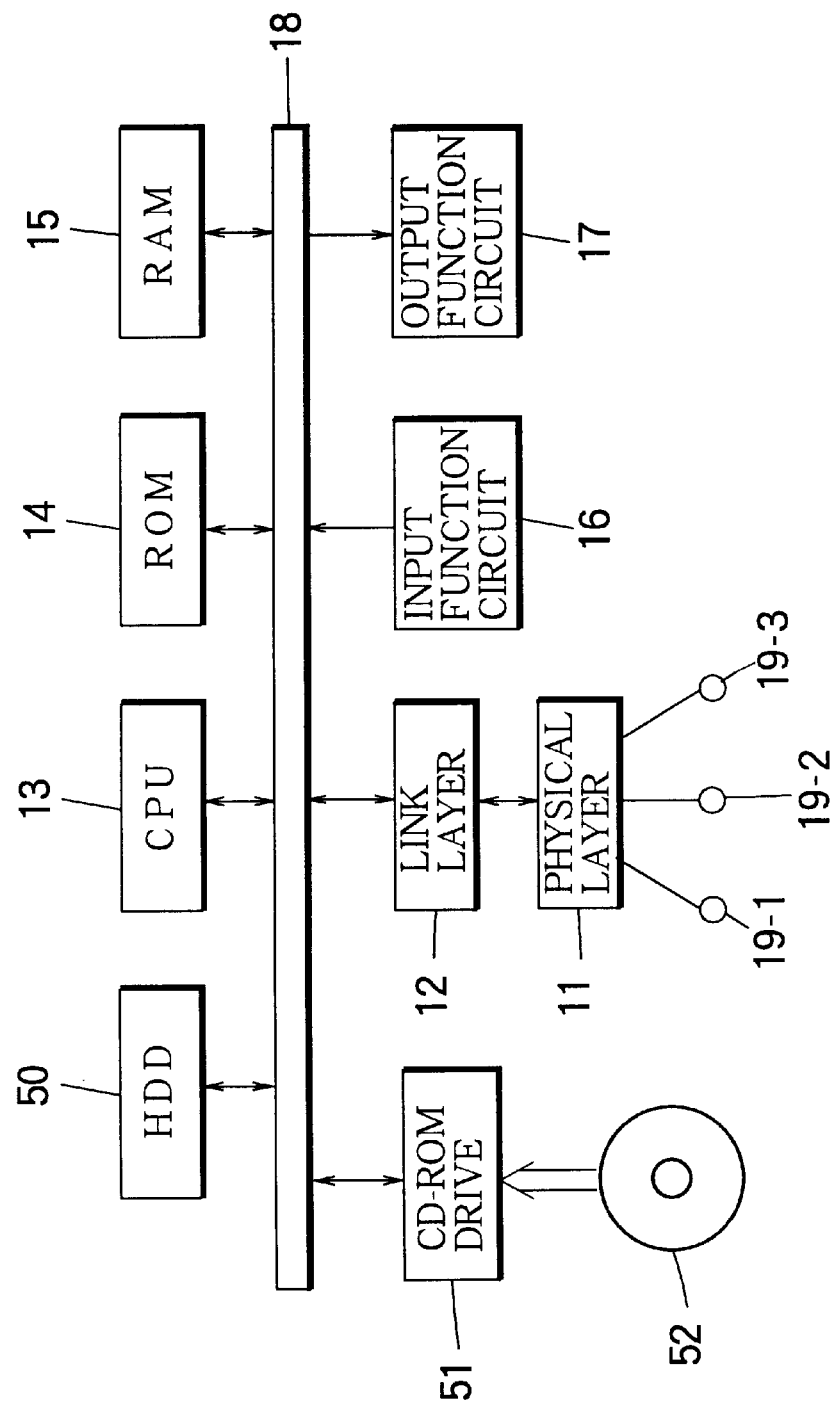
FIG. 10 is a schematic block diagram showing modified construction of the node.

FIG. 10 shows an additional node embodiment of the inventive musical network system. This embodiment has basically the same construction as the first embodiment shown in FIG. 2. The same components are denoted by the same references as those of the first embodiment to facilitate better understanding of the additional embodiment. The storage such as HDD 50, ROM 14 and RAM 15 can store various data and various programs including the system control program or basic program and other application programs. Normally, the ROM 14 provisionally stores these programs. However, if not, any program may be loaded into the node apparatus. The loaded program is transferred to the RAM 15 to enable the CPU 13 to operate the data communication in the inventive system. By such a manner, new or version-up programs can be readily installed in the system. For this purpose, a machine-readable media such as a CD-ROM (Compact Disc Read Only Memory) 52 is utilized to install the program. The CD-ROM 52 is set into a CD-ROM drive 51 to read out and download the program from the CD-ROM 52 into the hard disk drive (HDD) 50 through the bus 18. The machine-readable media may be composed of a magnetic disk or an optical disk other than the CD-ROM 52.

The node apparatus of the inventive network system can be implemented by a personal computer which is installed with the needed data and programs. In such a case, the data and programs are provided to the user by means of the machine-readable media such as the CD-ROM 52 or a floppy disk. The machine-readable media contains instructions for causing the personal computer to perform the inventive data transfer method as described in conjunction with the previous embodiments. Namely, the machine readable media contains instructions for causing the network system composed of a plurality of nodes interconnected to each other to perform the method of transferring a data packet from a transmitting node to receiving nodes so as to concurrently drive the same. The method comprises the steps of operating the transmitting node for estimating a time lag which exists between the transmitting node and each of the receiving nodes and which varies among the receiving nodes, detecting a maximum one of the estimated time lags so as to set a reference time by which all of the receiving nodes can be synchronized with each other, transmitting a data packet to the receiving nodes together with the reference time stamped on the data packet, operating each of the receiving nodes for receiving the data packet together with the stamped reference time, and temporarily retaining the received data packet for adjusting the difference in the time lags among the receiving nodes according to the reference time so that all of the receiving nodes can be driven concurrently with each other.

What is claimed is:

1. A network system comprising a plurality of nodes that are interconnected to each other and that transfer a data packet from a transmitting node to receiving nodes to concurrently generate output signals by processing the data packet, wherein the transmitting node includes (a) an estimating device that estimates a time lag which exists between the transmitting node and each of the receiving nodes and which varies among the receiving nodes, (b) a determining device that detects a maximum one of the estimated time lags to set a reference time by which all of the receiving nodes can be synchronized with each other to concurrently generate the output signals, and (c) a transmitting device that transmits a data packet to the receiving nodes together with the reference time stamped on the data packet; and wherein each of the receiving nodes includes (a) a receiving device that receives the data packet together with the stamped reference time, and (b) an adjustment device that temporarily retains the received data packet to adjust the difference in the time lags among the receiving nodes according to the reference time such that all of the receiving nodes can be driven to concurrently generate the output signals so that final output timings of the output signals are synchronized with each other.

2. A network system according to claim 1, wherein the estimating device estimates a transfer time lag which represents a traveling time of the data packet from the transmitting node to each of the receiving nodes so that the determining device detects a maximum one of the transfer time lags to set the reference time to thereby absorb difference in the transfer time lags among the receiving nodes.

3. A network system according to claim 2, wherein the estimating device estimates the transfer time lag in terms of a hop number counted from the transmitting node to each of the receiving nodes.

4. A network system according to claim 1, wherein the estimating device estimates an operational time lag which represents a time consumed for processing the data packet in each of the receiving nodes so that the determining device detects a maximum one of the estimated operational time lags to set the reference time to thereby absorb difference of the operational time lags among the receiving nodes.

5. A network system according to claim 1, wherein the estimating device estimates a total time lag which is a sum of a transfer time lag and an operational time lag, the transfer time lag representing a traveling time of the data packet from the transmitting node to each of the receiving nodes, and the operational time lag representing a time consumed for processing the data packet in each of the receiving nodes, so that the determining device detects the maximum one of the total transfer time lags as the reference time to thereby absorb difference in the total transfer time lags among the receiving nodes.

6. A network system according to claim 1, wherein the adjustment device temporarily retains the received data packet for an adjustive time interval which is calculated by subtracting the time lag from the reference time.

7. A network system according to claim 1, wherein the transmitting node transmits an audio data packet while each of the receiving nodes operates to generate an output signal, wherein the output signal comprises musical tones according to the audio data packet concurrently with each other when the reference time is reached.

8. A network system comprising a plurality of nodes interconnected to each other for transferring a data packet from a transmitting node to receiving nodes so as to concurrently generate output signals by processing the data packet, wherein the transmitting node includes (a) estimating means for estimating a time lag which exists between the transmitting node and each of the receiving nodes and which varies among the receiving nodes, (b) determining means for detecting a maximum one of the estimated time lags so as to set a reference time by which all of the receiving nodes can be synchronized with each other to concurrently generate the output signals, and to transmitting means for transmitting a data packet to the receiving nodes together with the reference time stamped on the data packet; and wherein each of the receiving nodes includes (a) receiving means for receiving the data packet together with the stamped reference time, and (b) adjustment means for temporarily retaining the received data packet for adjusting the difference in the time lags among the receiving nodes according to the reference time such that all of the receiving nodes can be driven to concurrently generate the output signals so that final output timings of the output signals are synchronized with each other.

9. In a network system comprising a plurality of nodes interconnected to each other, a method for transferring a data packet from a transmitting node to receiving nodes so as to concurrently generate output signals by processing the data packet, the method comprising the steps of:

operating the transmitting node for estimating a time lag which exists between the transmitting node and each of the receiving nodes and which varies among the receiving nodes;

detecting a maximum one of the estimated time lags so as to set a reference time by which all of the receiving nodes can be synchronized with each other to concurrently generate the output signals;

transmitting a data packet to the receiving nodes together with the reference time stamped on the data packet;

operating each of the receiving nodes for receiving the data packet together with the stamped reference time; and temporarily retaining the received data packet for adjusting the difference in the time lags among the receiving nodes according to the reference time such that all of the receiving nodes can be driven to concurrently generate the output signals so that final output timings of the output signals are synchronized with each other.

10. A machine readable media containing instructions for causing a network system composed of a plurality of nodes interconnected to each other to perform a method of transferring a data packet from a transmitting node to receiving nodes so as to concurrently generate output signals by processing the data packet, the method comprising the steps of:

operating the transmitting node for estimating a time lag which exists between the transmitting node and each of the receiving nodes and which varies among the receiving nodes;

detecting a maximum one of the estimated time lags so as to set a reference time by which all of the receiving nodes can be synchronized with each other to concurrently generate the output signals;

transmitting a data packet to the receiving nodes together with the reference time stamped on the data packet;

operating each of the receiving nodes for receiving the data packet together with the stamped reference time; and temporarily retaining the received data packet for adjusting the difference in the time lags among the receiving nodes according to the reference time such that all of the receiving nodes can be driven to concurrently generate the output signals so that final output timings of the output signals are synchronized with each other.

* * * * *